United States Patent
Kawamoto et al.

(10) Patent No.: US 6,772,726 B2
(45) Date of Patent: Aug. 10, 2004

(54) MULTIPLE-POSITION, OPERATOR-CARRIED, FOUR-STROKE ENGINE

(75) Inventors: Shiro Kawamoto, Chandler, AZ (US); Harry Gene Richard, Phoenix, AZ (US); John Sheldon, Chandler, AZ (US); Yoichi Imgawa, Chandler, AZ (US)

(73) Assignee: MTD Southwest, Inc., Chandler, AZ (US)

( * ) Notice: Subject to any disclaimer, the term of this patent is extended or adjusted under 35 U.S.C. 154(b) by 0 days.

(21) Appl. No.: 10/068,797

(22) Filed: Feb. 5, 2002

(65) Prior Publication Data

US 2002/0121262 A1 Sep. 5, 2002

Related U.S. Application Data

(62) Division of application No. 09/488,218, filed on Jan. 19, 2000, now Pat. No. 6,374,796, which is a continuation of application No. 09/035,552, filed on Mar. 5, 1998, now Pat. No. 6,039,020.

(51) Int. Cl.[7] .............................................. F01M 11/02
(52) U.S. Cl. ............................ 123/196 W; 123/196 M
(58) Field of Search ..................... 123/196 R, 196 W, 123/196 M, 193.2; 184/6.2, 6.5, 6.9, 6.18, 6.26, 11.1

(56) References Cited

U.S. PATENT DOCUMENTS

| | | | |
|---|---|---|---|
| 4,404,936 A | * | 9/1983 | Tatebe et al. ............ 123/196 R |
| 4,563,986 A | * | 1/1986 | Nakano .................. 123/195 R |
| 4,969,434 A | * | 11/1990 | Nakagawa ............... 123/196 R |
| 5,025,762 A | | 6/1991 | Gohara et al. ............ 123/196 S |
| 5,149,287 A | | 9/1992 | Koike ..................... 123/196 R |
| 5,167,207 A | | 12/1992 | Gohara et al. ............ 123/196 S |
| 5,176,116 A | * | 1/1993 | Imagawa et al. ......... 123/90.31 |
| 5,213,074 A | * | 5/1993 | Imagawa et al. ......... 123/90.23 |
| 5,241,932 A | | 9/1993 | Everts |
| 5,329,896 A | | 7/1994 | Everts |
| 5,375,666 A | | 12/1994 | Pettet et al. |
| 5,421,292 A | | 6/1995 | Hoffman et al. |
| 5,447,127 A | | 9/1995 | Lück et al. ............. 123/196 W |
| 5,558,549 A | | 9/1996 | Nakase et al. ................ 440/88 |
| 5,606,943 A | * | 3/1997 | Tamba et al. .......... 123/196 M |
| 5,606,944 A | * | 3/1997 | Kurihara ................ 123/196 W |
| 5,709,185 A | * | 1/1998 | Aizawa et al. ......... 123/196 M |
| 5,738,062 A | * | 4/1998 | Everts ..................... 123/90.38 |
| 5,860,403 A | * | 1/1999 | Hirano et al. ........... 123/196 R |
| 5,947,075 A | * | 9/1999 | Ryu et al. .............. 123/196 W |
| 6,039,020 A | * | 3/2000 | Kawamoto et al. ..... 123/196 R |
| 6,047,678 A | * | 4/2000 | Kurihara et al. ........ 123/196 R |
| 6,109,251 A | * | 8/2000 | Haberlein et al. .......... 123/572 |
| 6,119,648 A | * | 9/2000 | Araki ..................... 123/196 R |
| 6,167,990 B1 | * | 1/2001 | Peng ..................... 123/196 W |
| 6,170,456 B1 | * | 1/2001 | Gu et al. ................. 123/196 S |
| 6,216,660 B1 | * | 4/2001 | Ryu et al. .............. 123/196 W |
| 6,283,084 B1 | * | 9/2001 | Nagai et al. ............ 123/196 R |
| 6,363,904 B1 | * | 4/2002 | Kurihara et al. ........ 123/196 R |
| 6,374,796 B1 | * | 4/2002 | Kawamoto et al. .... 123/196 M |

OTHER PUBLICATIONS

Katsumi Kurihara, Shiro Kawamoto and James Grayson, Multi–Position Operable Four–Cycle Engine; Mar. 8, 1996; Ser. No. 08/614,835.

* cited by examiner

*Primary Examiner*—Henry C. Yuen
*Assistant Examiner*—Hai Huynh
(74) *Attorney, Agent, or Firm*—Brinks Hofer Gilson & Lione

(57) ABSTRACT

An oil mist generator is connected drivably to the crankshaft for agitating liquid oil in the crankcase to establish a lubricating oil mist. The crankcase, the cam region and the valve chamber form a closed oil mist containment whereby lubricating oil mist is distributed throughout the engine during operation regardless of angular orientation of the engine. The crankshaft ventilation passage establishes lean crankcase gas distribution to the engine air/fuel intake. The crankcase is designed to avoid flow of liquid oil through the crankshaft passage when the engine is not running.

4 Claims, 8 Drawing Sheets

MULTIPLE-POSITION, OPERATOR-CARRIED, FOUR-STROKE ENGINE

This application is a division of Ser. No. 09/488,218, filed Jan. 19, 2000, which is now U.S. Pat. No. 6,374,796, issued Apr. 23, 2002, which is a continuation of Ser. No. 09/035,552, filed Mar. 5, 1998, which is now U.S. Pat. No. 6,039,020, issued Mar. 21, 2000.

TECHNICAL FIELD

This invention relates to four-stroke, internal combustion engines, particularly lightweight, four-stroke engines for operator-carried power tools.

BACKGROUND ART

It is conventional practice in the design of outdoor power tools to use a two-stroke internal combustion engine or an electric motor for powering an implement such as a line trimmer, a blower/vacuum or a chain saw. Two-stroke internal combustion engines are relatively light and may readily be carried by an operator during operation with various angular orientations. Two-stoke engines, however, have well-recognized exhaust emissions problems that often make them unfeasible for their use in areas that must comply with exhaust gas emissions regulations such as the California Air Resource Board (CARB) and Federal EPA regulations dealing with California air quality.

Limitations on the exhaust emissions of carbon monoxide, hydrocarbons and oxides of nitrogen that will be required in the year 2000 cannot feasibly be met by outdoor power tools powered by using two-stroke internal combustion engines. Four-stroke internal combustion engines, on the other hand, provide a distinct advantage for outdoor power tool manufacturers in their attempt to meet the 2000 CARB emissions regulations. In addition, they operate quieter compared to two-stroke engines.

Unlike two-stroke engines which simultaneously admit a fresh charge of fuel and air mixed with lubrication oil while exhausting combustion products, including unburned fuel, a four-stroke internal combustion engine maintains the lubricating oil relatively isolated from the combustion chamber.

The intake and exhaust valve region and the camshaft and cam drive portions of a four-stroke internal combustion engine are lubricated with oil supplied from the crankcase. The combustion chamber remains relatively isolated from the crankcase. Lubricating oil is not introduced into the air/fuel mixture as in the case of a two-stroke engine. Lubrication of the cylinder wall occurs as a film of crankcase oil develops on the cylinder wall. The piston rings seal the variable volume combustion chamber and effectively prevent mixing of the lubrication oil with the combustion gases.

One disadvantage of using four-stroke internal combustion engines for outdoor power tools, aside from a weight disadvantage, traditionally has been the inability to operate the engine upside down or at the extreme tilt angles that would be required by the operator. Oil in the crankcase in those instances would tend to be drained through the engine block to the intake and exhaust valve region of the engine and would enter the air/fuel mixture intake flow path as well, thereby upsetting otherwise efficient fuel combustion during operation. Continuous operation of the engine, even for relatively short periods, may result in piston seizure because of an interruption of lubrication oil flow to the cylinder wall.

Many of the shortcomings associated with the use of four-stroke engines with outdoor power tools have been solved by the teachings of U.S. Pat. Nos. 5,241,932 and 5,421,292, which are incorporated in the present disclosure by reference. Those patents, which are assigned to the assignee of the present invention, disclose engines which avoid the weight disadvantage of using a four-stroke internal combustion engine in an outdoor power tool. Further, they make provision for efficient engine operation throughout a wide range of angular dispositions or orientations.

Copending U.S. patent application Ser. No. 08/614,835, filed Mar. 8, 1996, which also is assigned to the assignee of the present invention, describes a further improvement in the earlier prior art teachings. That improvement makes it possible to maintain distribution of lubrication oil mist throughout the engine while maintaining the liquid lubrication oil isolated from the valve chamber and the cam and cam drive system. The engine of the copending application, which is incorporated in the present disclosure by reference, includes a lubricating oil mist passage that is formed in the crankshaft and in the crankshaft counterweight. The crankshaft passage facilitates distribution of lubricating oil in the form of an oil mist through the region of the camshaft and the camshaft drive of the engine and through oil mist flow passages to an overhead valve chamber.

A lubricating oil mist generator driven by the crankshaft agitates liquid oil in the crankshaft and develops a lubricating oil mist which is transferred through the engine in a flow path defined in part by the crankshaft passage. Large oil droplets in the oil mist and liquid oil in the crankcase are prevented from entering the crankshaft passage by the effect of centrifugal force due to the rotation of the crankshaft and the crankshaft counterweight during engine operation. A fine oil mist, however, may pass through the crankshaft passage and through the engine lubrication system since the mist is relatively unaffected by the centrifugal forces created by the rotating crankshaft.

DISCLOSURE OF THE INVENTION

The present invention is a further improvement in engines of the type shown in the '932 and '292 patents and in the copending patent application previously identified. Unlike the previously disclosed engines, however, the engine of the present invention does not include a breather or crankcase scavenger region at an upper portion of the engine assembly, such as the top of the valve chamber, or at the upper side of the engine block. Rather, the present invention comprises a closed, multiple-region oil mist containment that includes the crankcase, the camshaft and cam gear drive portion of the engine, and the valve chamber. These regions of the engine assembly are in communication, one with respect to the other, by reason of an oil mist flow passage window in the crankcase portion of the engine assembly.

The engine embodiment of this disclosure includes an air/fuel carburetor with an operator-controlled butterfly valve. The improvements of the invention may be used, however, with engines having other types of air/fuel controls (e.g., electronically controlled fuel injectors).

Oil mist in the engine of the present invention is generated by an oil mist generator or splasher that is driven by the crankshaft so that liquid oil in the crankcase readily is converted into a lubricating oil mist. As in the case of the engine of the copending application, the crankshaft of the present invention includes a radial passage in the crankshaft and in the crankshaft counterweight. Unlike the engine of the copending application, however, the crankshaft passage of the engine of the present disclosure distributes crankcase gases through the engine and ultimately to the air/fuel induction passages. The centrifugal force acting on the crankcase gases, which would include the oil mist itself, ensure that the crankcase gases will be relatively lean before they enter the air cleaner and air/fuel intake region of the engine. This contributes to efficient engine operation and makes it possible to achieve the most energy-efficient combustion since the air/fuel mixture determined by the engine carburetor controls will not be adversely affected by the presence of the lean crankcase gases during positive crankcase ventilation.

The intake end of the crankshaft passage of the engine of the present invention is not in direct communication with the liquid oil in the crankcase. This is achieved by using a strategic crankcase geometry which allows the level of the liquid oil in the crankcase to be separated at all times from the crankshaft passage regardless of the angular orientation of the engine. When the engine is not running and the lubricating oil in the crankcase is in liquid form, the liquid oil will be prevented from passing through the positive crankcase ventilation passage structure. Liquid crankcase lubricating oil, therefore, will not enter the intake and exhaust valve area at the top of the engine, nor will it enter the air/fuel intake region of the engine. The positive crankcase ventilation passages and the crankcase scavenger system will be completely isolated from the valve chamber, the cam and cam gear drive region of the engine and the combustion chamber when the engine is shut down.

According to another objective of the present invention, provision is made to physically separate the power cylinder region of the engine from the crankcase region by providing baffles as part of the engine crankcase casting. The baffles extend across the bottom skirt of the power cylinder. A piston rod, which connects the engine piston to the crankshaft, extends through an aperture between the baffles. The wall of the cylinder below the piston during operation of the engine thus is semi-isolated from the crankcase, thereby reducing the amount of oil that is distributed from the crankcase into the power cylinder. Sufficient oil for lubrication purposes is maintained, but excess oil is inhibited by the baffles from entering the cylinder bore. This feature further improves the operating efficiency of the engine and reduces oil consumption.

The cam chamber, which encloses the cam and cam gear drive, is formed in the cylinder block and in the crankcase. A cylinder head secured to the cylinder block defines the intake and exhaust ports and a valve cover secured to the cylinder head defines a valve chamber for intake and exhaust valves. A rocker arm assembly in the valve cover actuates the valves, and push rods drivably connect the cam to the rocker arm assembly. Push rod openings in the cylinder block provide communication between the valve cover and the cam chamber.

Oil mist in the crankcase is distributed to the cam chamber through the oil mist flow passage window.

PARTICULAR DESCRIPTION OF THE INVENTION

Figure 1:
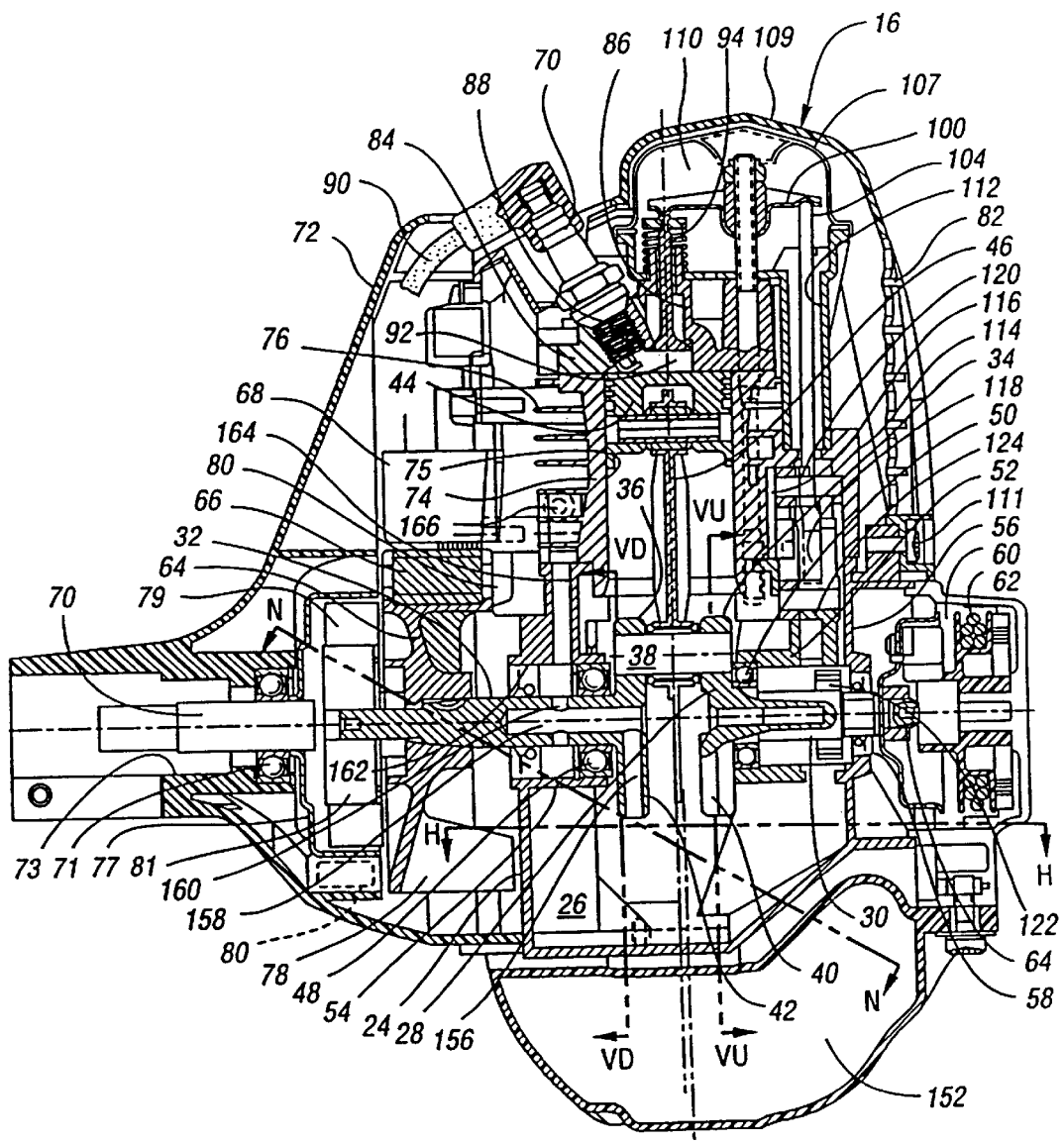
FIG. 1 is a cross-sectional view of the engine of the present invention taken along the plane that contains the axis of the crankshaft.
Figure 1A:
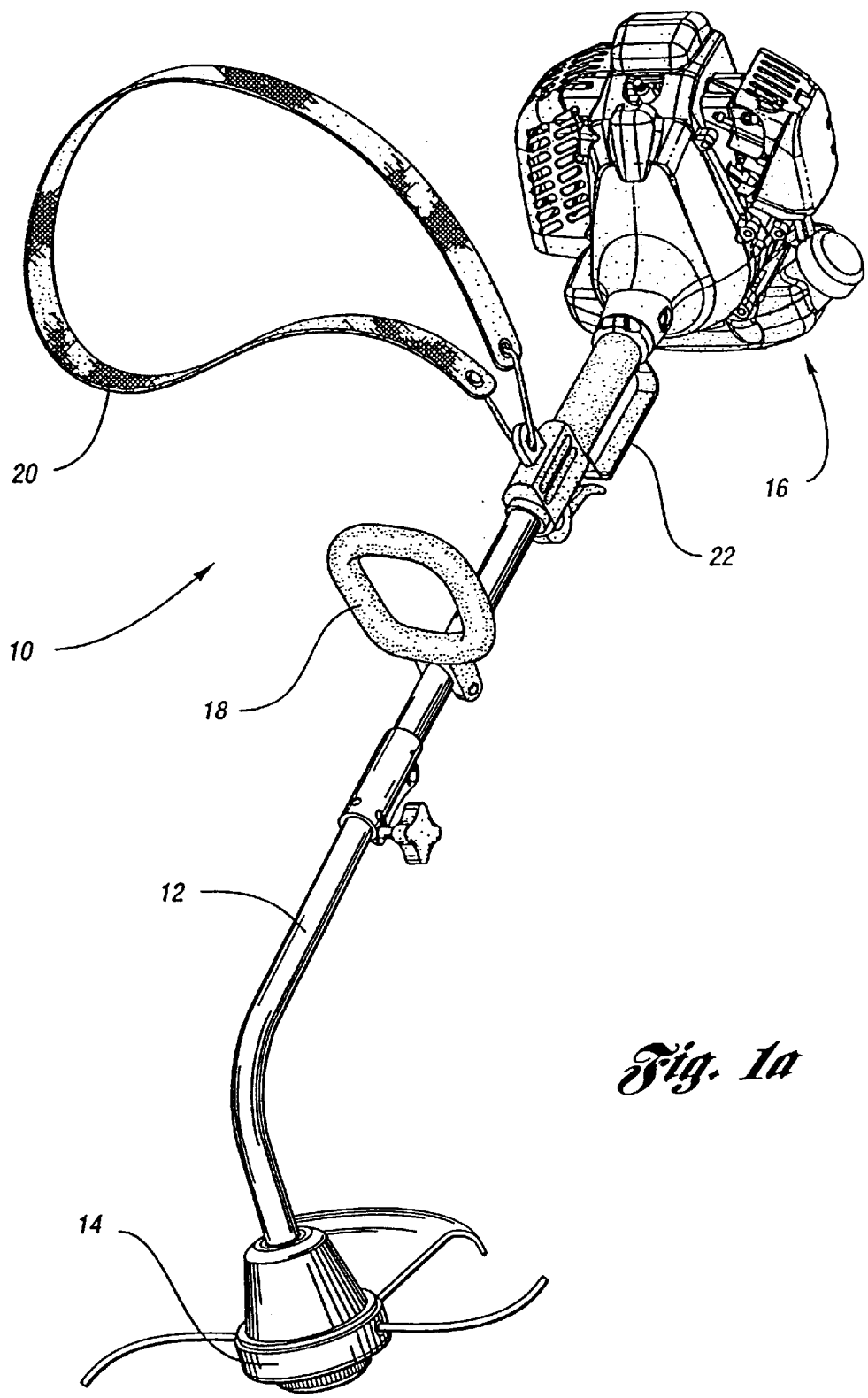
FIG. 1a is a schematic representation of a grass trimmer powered by a four-stroke engine, as indicated in FIG. 1.

In FIG. 1a, a portable, hand-held grass trimmer is shown at 10. It includes a frame 12 on which is mounted an implement such as a rotary trimmer head, shown at 14. A four-stroke internal combustion engine is mounted on the frame 12 at the opposite end as shown at 16. The engine 16 has an engine-driven crankshaft that is connected drivably to the rotary head 14 by a flexible cable drive located in the frame 12, which comprises a hollow tubular structure. A handle and grip is shown at 18 and a shoulder strap 20 is situated at a location near the center of gravity of the trimmer assembly. The strap 20 is adapted in the usual fashion to overlie an operator's shoulder as the handle and grip enable the operator to control the position of the trimmer. An auxiliary handle and grip may be used as generally indicated at 22.

As seen in FIG. 1, the engine comprises a crankshaft housing 24 which defines at its lower region a liquid lubricating oil reservoir or chamber 26. A crankshaft assembly 28 of generally U-shape includes a first shaft portion 30 and a second shaft portion 32. Crankshaft throw portions 34 and 36 are formed integrally with the shaft portions 30 and 32, respectively. A crankpin 38 joins the crankshaft throws 34 and 36.

A pair of crankshaft counterweights 40 and 42 is formed on the crankshaft directly opposite the crankshaft throws as seen at 34 and 36, respectively. The crankpin is connected to reciprocating piston 44 by piston rod 46.

The crankshaft 28 is straddle-mounted by spaced, sealed bearings 48 and 50 located on opposed sides of the crankpin. Sealed bearing 50 rotatably supports the crankshaft portion 30 in boss 52, which is cast integrally with the crankshaft housing. Similarly, the bearing 48 journals the crankshaft portion 32 in bearing support 54, which also forms a part of the crankshaft housing casting.

The crankshaft housing has an end wall 56 with an opening through which crankshaft portion 30 extends. A fluid seal 58 isolates the interior of the crankshaft housing from the region of the starter pulley mechanism 60. The starter cord 62 is wound on a starter pulley which is keyed or splined at 64 to the right end of the crankshaft portion 30.

The left end of the crankshaft portion 32 is keyed to a drive disc 64 of a magneto that includes rotary magnets 66 and an ignition coil assembly 68 for developing electrical energy for a spark plug 70, as will be described subsequently.

The left end of the crankshaft portion 32 is formed with a splined portion which registers with an adapter shaft 70 to effect a driving connection with a flexible drive cable that extends through the tubular frame 12, as explained previously. A housing 72, which may be formed of a suitable structural plastic material, such as fiberglass reinforced nylon, surrounds one side of a cast aluminum alloy cylinder block 74 which has a single cylinder bore 75 in which a piston 44 reciprocates. Cooling fins 76 are formed on the cylinder block 74.

Shaft 70 is supported by a bearing 71 seated in bearing support 73, and it is connected drivably to centrifugal clutch drum 77 surrounding centrifugal clutch shoes 79. The centrifugal clutch drum 77 is surrounded by the nylon cover 72. The rotor of the centrifugal clutch is drivably connected to crankshaft portion 32 as shown at 81.

The disc 64, which is keyed or otherwise secured to the crankshaft portion 32, is formed with impeller blades 78 and 80, which act as a centrifugal air pump. When the engine is operating, the rotating crankshaft will drive the blades 78 and 80, thereby creating a forced cooling air flow from an intake air duct 80. The air is circulated across the cooling fins 76 and exits the engine assembly through an air flow grid 82. Heat radiated from the combustion chamber at the upper end of the cylinder bore thus is dissipated by the cooling air flow.

A cast cylinder head 84 is secured to the top deck or upper surface of the cylinder block 74. It is formed with intake and exhaust valve openings, the intake valve opening being shown at 86.

The spark plug opening 88, also formed in the head 84, receives spark plug 70. Spark plug voltage distribution line, shown at 90, extends to the magneto assembly.

Cylinder head 84 cooperates with the top of the cylinder block 44 to define a combustion chamber 92.

Figure 2:
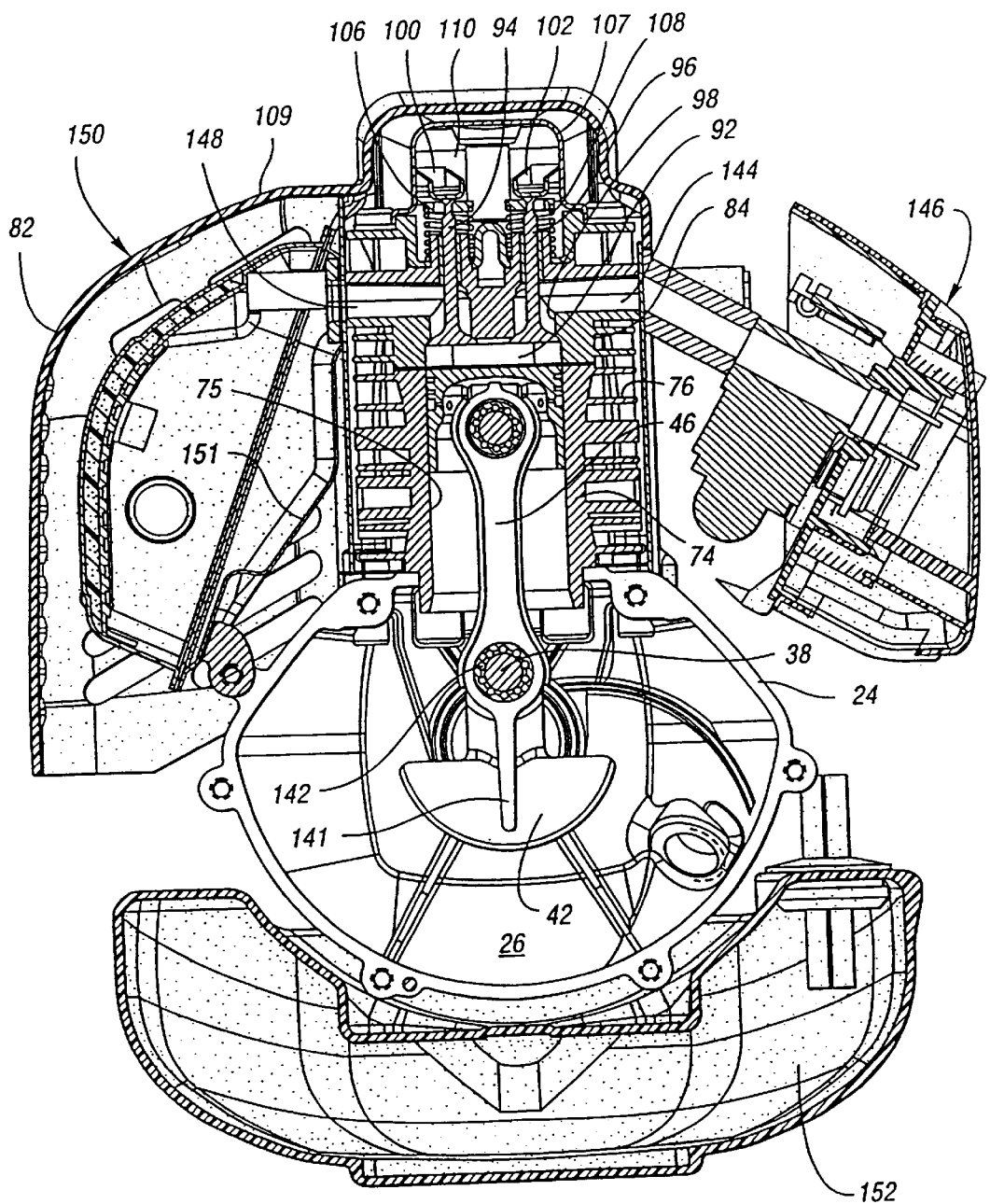
FIG. 2 is a cross-sectional view taken along a plane perpendicular to the axis of the crankshaft.

The exhaust valve is shown in FIGS. 1 and 2 at 94. An air/fuel mixture intake valve is shown in FIG. 2 at 96. It is received in the intake valve opening 98 formed in the cylinder head 84.

A rocker arm 100 has one end thereof engageable with the exhaust valve 94. A corresponding rocker arm, not seen in FIG. 1 but which is shown at 102 in FIG. 2, opens the intake valve. The rocker arms are actuated by push rods, one of which is shown at 104 in FIG. 1. The valves are closed by valve springs, which are seen in FIG. 2 at 106 and 108.

The rocker arms at the upper ends of the valve stems for the valves 94 and 96 are enclosed by a valve cover 107, which defines a valve chamber 110. Valve cover 107, which may be a steel stamping, is bolted to the top of the cylinder block 74.

Figure 3:
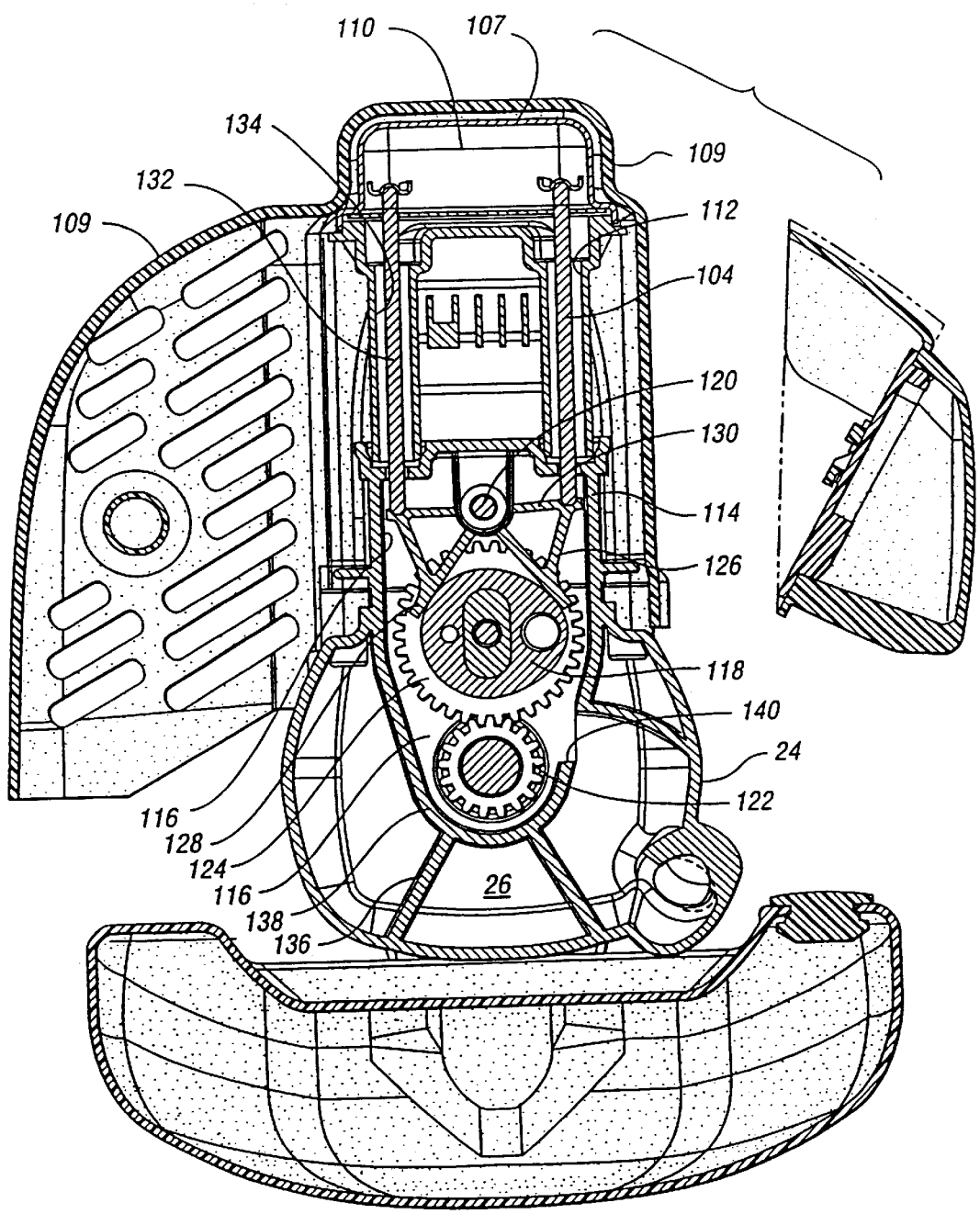
FIG. 3 is a cross-sectional view taken on a plane perpendicular to the axis of the crankshaft at a location proximate to the area of the engine block containing the cam gear drive mechanism.
Figure 4:
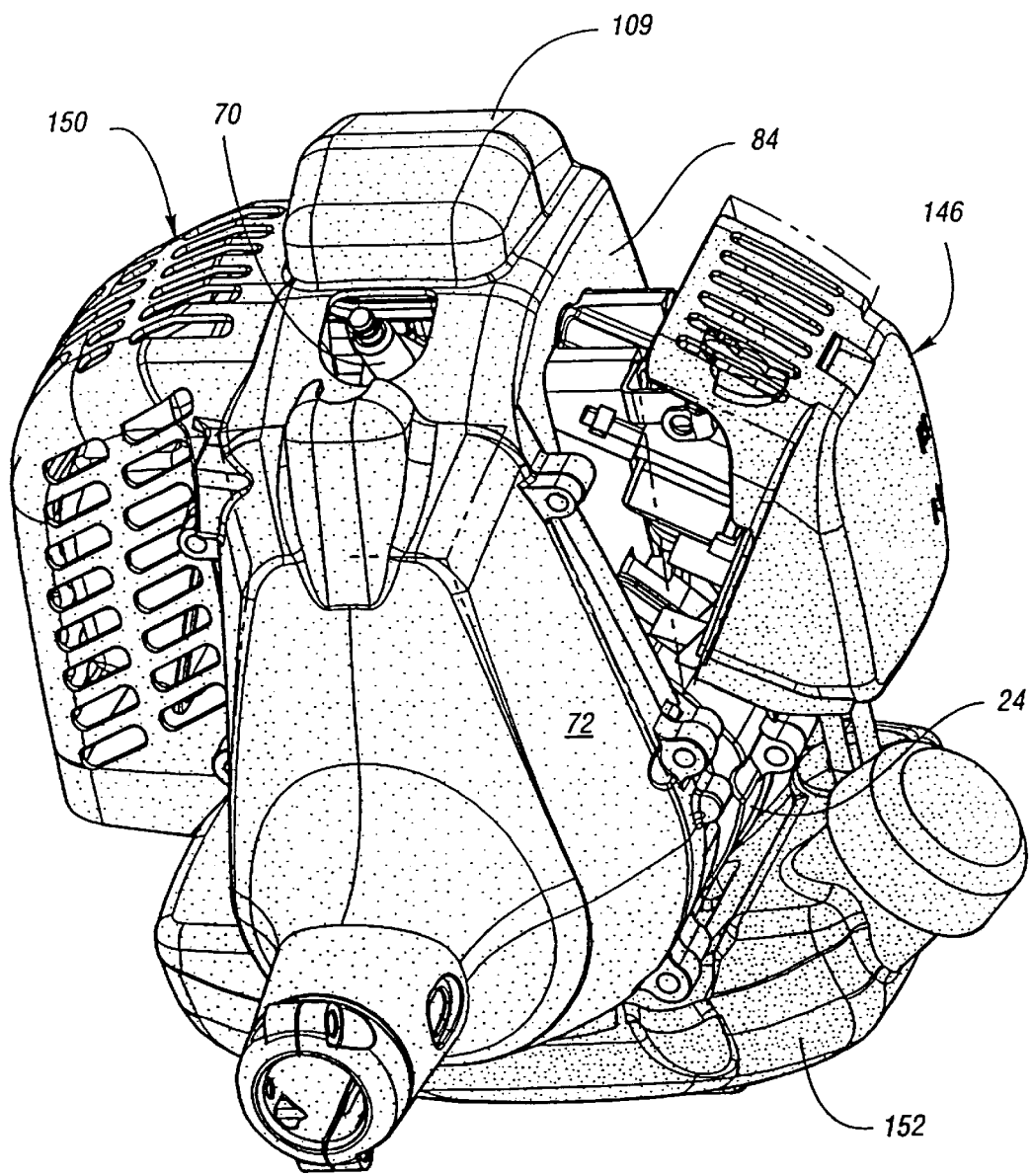
FIG. 4 is an isometric overall assembly view of the engine illustrating the external engine features.

The push rods extend downwardly, as best seen in FIGS. 1 and 3, through generally vertical openings 112 and 134 formed in the cylinder head casting. The opening 112 for the push rod 104, which actuates the exhaust valve 94, and the opening 134 for the companion push rod 132 for the intake valve have a sufficient diameter to define a flow passage for the lubricating oil mist as will be described subsequently.

An engine cover 109 and the grid 82 may be a unitary nylon molding which can be bolted at 111 to the crankcase housing 24.

The cylinder block 74 includes a portion 114 that defines a chamber 116 enclosing a cam 118, as will be described with reference to FIG. 3.

A frog-leg type cam follower, which is best seen in FIG. 3, is mounted for oscillatory movement on support shaft 120. Support shaft 120, in turn, is supported in openings formed in the cylinder block 74.

A cam drive gear 122 is fixed or otherwise secured to crankshaft portion 30 on the inboard side of the seal 58. Drive gear 122 meshes with and drives cam gear 124. The cam 118 is fixed to gear 124 and rotates with it.

As seen in FIG. 3, cam 118 is engaged by cam follower portions 126 and 128 on frog-leg cam follower 130. As best seen in FIG. 3, the follower 130 engages the lower ends of the push rods of the intake and exhaust valves. The push rod for the intake valve, as previously mentioned, is shown at 132. The push rod for the exhaust valve, which also was previously mentioned, is shown in FIG. 3 as well as in FIG. 1.

The push rod 132 is received in a generally vertically extending opening 134 corresponding to the opening 112 for the exhaust valve push rod 104. As in the case of opening 112, the opening 134 establishes communication between the cam chamber 116 and the valve chamber 110.

The crankcase housing 24, as best seen in FIG. 3, is provided with internal bosses 136 as well as an internal wall 138 that forms a part of the crankcase housing. It partially encircles or envelopes the camshaft drive gear 122. An opening or window 140 is formed in the wall 138, thereby providing communication between chamber 116 for the cam 118 and crankcase chamber 26. Bosses 136 are generally radial and are positioned at each axial side of the housing 24.

As best seen in FIG. 2, a splasher or oil mist generator is indicated at 141. It is located between counterweight 42 and counterweight 40, although it could be located at other locations as it is driven by the crankshaft.

The connecting rod 46 is journalled on the crankpin 38 by bearing 142. As the crankshaft rotates, the oil mist generator or splasher 141 will intermittently engage the oil in the crankcase chamber 26, thereby agitating the oil and creating an oil mist that occupies the entire crankcase chamber.

The intake valve opening 98 communicates with intake passage 144, as best seen in FIG. 2. An air cleaner assembly 146 allows passage of a mixture of intake air and fuel to the intake passage 144. The exhaust passage for the engine is shown in FIG. 2 at 148. It extends to an exhaust assembly indicated generally at 150. A heat shield of suitable heat resistant polymer/resin material may be located between the exhaust passage outlet and the engine castings, as shown at 151 in FIG. 2.

A molded nylon fuel tank containing gasoline is shown in FIG. 2 at 152. As is seen in FIGS. 1 and 2, the tank 152 is located below the crankcase chamber 26, the shape of the crankcase chamber 26 being generally circular about the axis of the crankshaft when the engine is viewed in the direction of the axis of the crankshaft, as seen in FIG. 2. The plane of FIG. 2 is 90' from the plane of the cross-sectional view of FIG. 1. The crankcase chamber 26 is substantially below the crankshaft in the region of the plane of the crankshaft throws.

It is apparent from the foregoing description that the oil mist generated in the crankcase during operation of the engine is transmitted throughout the crankcase chamber as well as throughout the cam chamber 116 and the valve chamber 110. This is due to communication between the chambers, one with respect to the other, in a closed containment. As mentioned previously, that communication is established in part by window 140.

Unlike the design shown, for example, in the copending patent application Ser. No. 08/614,835, neither the valve cover nor the cylinder housing includes a breather opening. The closed containment defined by the valve chamber, the cam housing portion and the crankcase receives the oil mist generated by the oil mist generator during operation, thereby ensuring complete engine lubrication as liquid oil is isolated from the combustion chamber.

The crankcase scavenger or ventilation system now will be described.

Referring first to FIG. 1, the counterweight 42 is provided with a radial passage 156 which communicates with an axial passage 158 formed in the crankshaft portion 32. A radial port 160 is formed in the crankshaft portion 32 at a location intermediate the sealed bearing 48 and oil seal 162. This provides communication between radial passage 156 and radial passage 164, which is formed in the crankcase housing. Passage 164 communicates with a tube or passage 166 extending to the exterior of the cylinder block. Passage 166, in turn, communicates with the air/fuel intake system in the region of the air cleaner indicated at 146 in FIG. 2.

During engine operation, the radial passage 156 rotates with the crankshaft at high speed. The centrifugal action due to this rotation causes large oil droplets and liquid oil to be expelled radially outward, thereby preventing the crankcase gas that passes through passage 158 from transporting liquid oil.

The crankcase gas that ultimately reaches the air/fuel intake system of the engine thus is relatively lean. Crankcase gas thus does not interfere with combustion. Exhaust gas emissions are substantially improved in quality for this reason. Further, the absence of a crankcase breather eliminates the discharge of crankcase gas to the atmosphere.

Shown in FIG. 1 are four reference lines that are identified by the letters N, H, VD and VU. These reference lines represent the level of oil in the crankcase chamber 26 at various angular orientations of the engine when the engine is not running. During normal operation, the oil level is represented by the line N—N. It is seen that the reference line N—N is below the inlet to the passage 156 in the counterweight 42. Likewise, when the engine is held in a horizontal position, the oil level represented by line H—H is below the inlet of the passage 156.

If the engine is turned in the vertical downward direction (i.e., the crankshaft at its outboard end extends downward), the oil level would be represented by the line VD—VD. Likewise, if the engine is moved to a vertical upward orientation, the oil level line would be represented by the line VU—VU. It is apparent that regardless of the orientation of the engine, liquid oil is not allowed to enter the passage 156. Thus, when the engine is shut down, there is no occasion for oil to leak into the air/fuel intake system nor to leak into the valve chamber.

Figure 5:
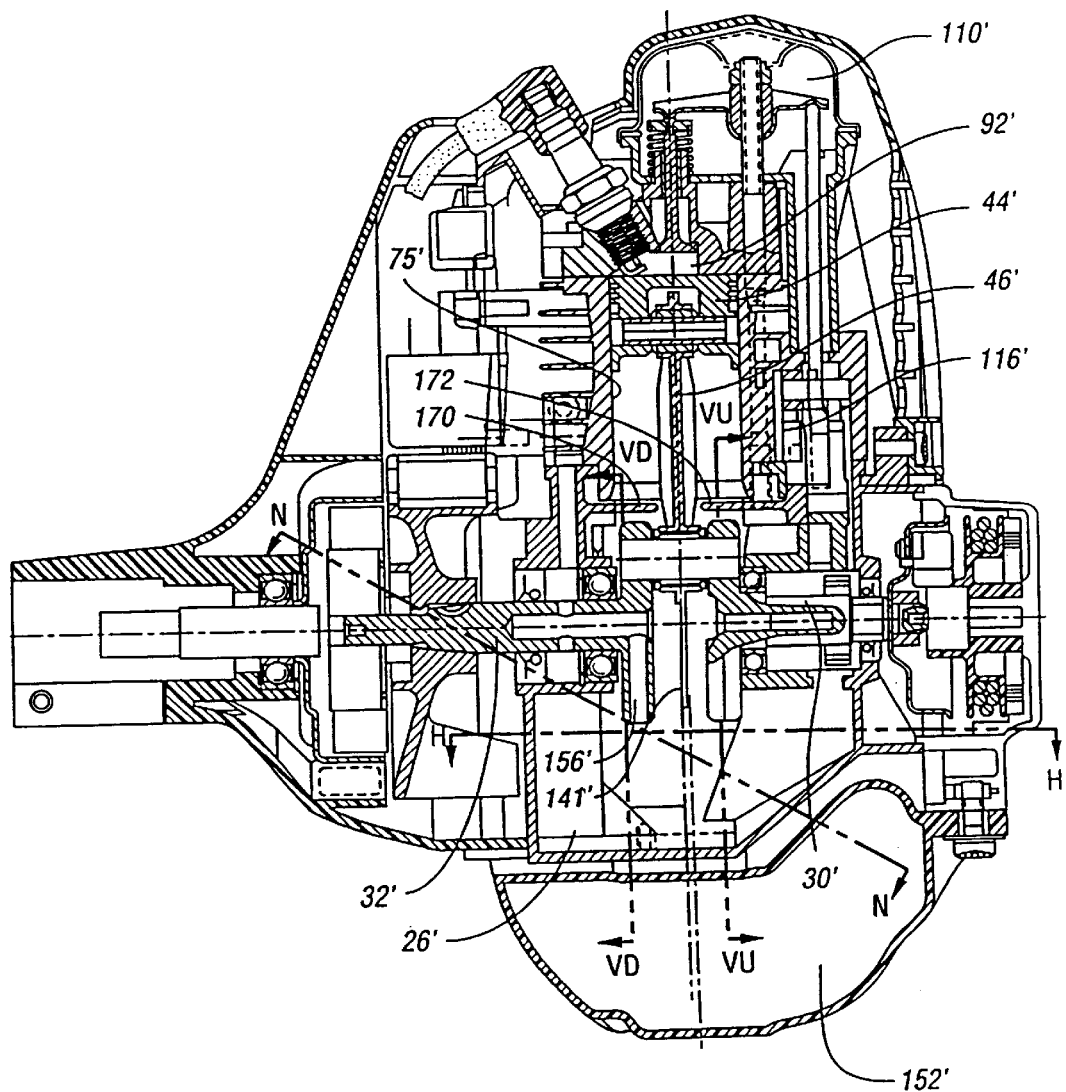
FIG. 5 is a cross-sectional view of an alternate embodiment of the invention taken on a plane that contains the axis of the crankshaft and which shows oil splashguard baffle structure at the lower end of the power cylinder.
Figure 6:
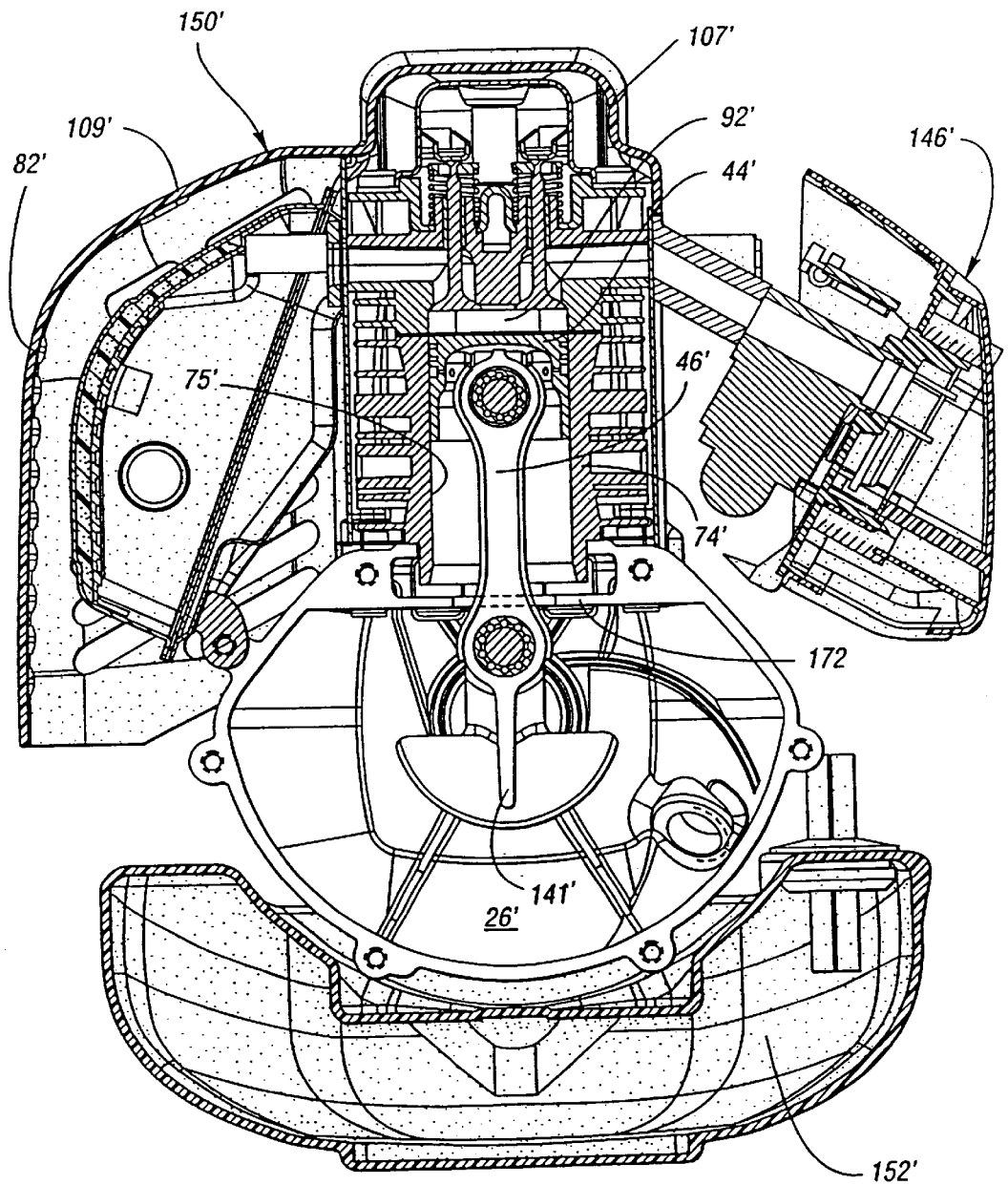
FIG. 6 is a cross-sectional view of the engine of FIG. 5 taken on a plane perpendicular to the axis of the crankshaft.

FIGS. 5 and 6 are cross-sectional views of a modified engine. These views correspond generally to FIGS. 1 and 3. They differ from FIGS. 1 and 3, however, because they illustrate oil splashguard baffle walls 170 and 172 formed in the crankcase housing. These baffle walls extend toward the connecting rod 46' which corresponds to the connecting rod 46 of FIGS. 1 and 3.

The elements of the engine construction shown in FIGS. 5 and 6 that have corresponding elements in the engine construction of FIGS. 1 and 3 have been identified in FIGS. 5 and 6 by identical reference numeral, although prime notations are added.

The space between the splashguard baffle walls 170, 172 will permit the connecting rod 46' to oscillate freely as the piston traverses the extent of the cylinder bore. The baffle walls 170, 172 effectively cover a major portion of the lower opening in the skirt of the cylinder bore. This substantially reduces the distribution of oil mist from the crankcase chamber 26' to the cylinder bore below the piston 44'. Since less oil will wet the surface of the bore, the presence of the baffle walls reduces the oil consumption while allowing sufficient oil to reach the cylinder walls for lubrication purposes. In a preferred embodiment of the invention, for example, the baffles have been found to reduce oil consumption from about 3 cc/hr to 1 cc/hr.

During operation of the engine, the oil mist generator 141 will sufficiently agitate the oil in crankcase chamber 26. The energy thus imparted to the oil creates an oil mist and distributes it throughout the confined containment defined by the chamber 26, the chamber 116 and the chamber 110. The sinusoidal pressure pulses created by the reciprocation of the piston 44 contribute to this dispersion of the oil mist.

The rotating cam drive gear 122 and the driven gear 124 further augment the dispersion of oil mist throughout the closed oil mist containment as oil mist is transferred through window 140 in the wall 138 and into the chamber 116. The rotating gear teeth of the drive and driven gears 122 and 124 disperse oil mist that passes through window 140 and assists in the development and distribution of an admixture of fine oil droplets and air throughout the closed containment. The oil mist is dispersed in sufficient quantity to lubricate the engine.

The teeth of the drive and driven gears 122 and 124 preferably move respectively in a counterclockwise direction and in a clockwise direction as the admixture of fine oil droplets and air is induced to traverse the chamber 26 and to enter the push rod openings 112 and 134 and the valve chamber 110. The gears 122 and 124 could be made to function as a gear pump, however, if the window 140 in wall 138 were to be located on the opposite side of the gears. The pumping effect of the gears in that instance would contribute to distribution of oil mist throughout the closed containment. The efficiency of the pumping effect of the gears would increase, of course, if the clearance between the addendum circle for the gear teeth and the wall 138 would be decreased.

The gear pumping effect could be obtained also if the engine were to be designed so that the direction of gear tooth rotation could be reversed. In that instance, the window 140 would be located as it is shown in FIG. 3.

Figure 7:
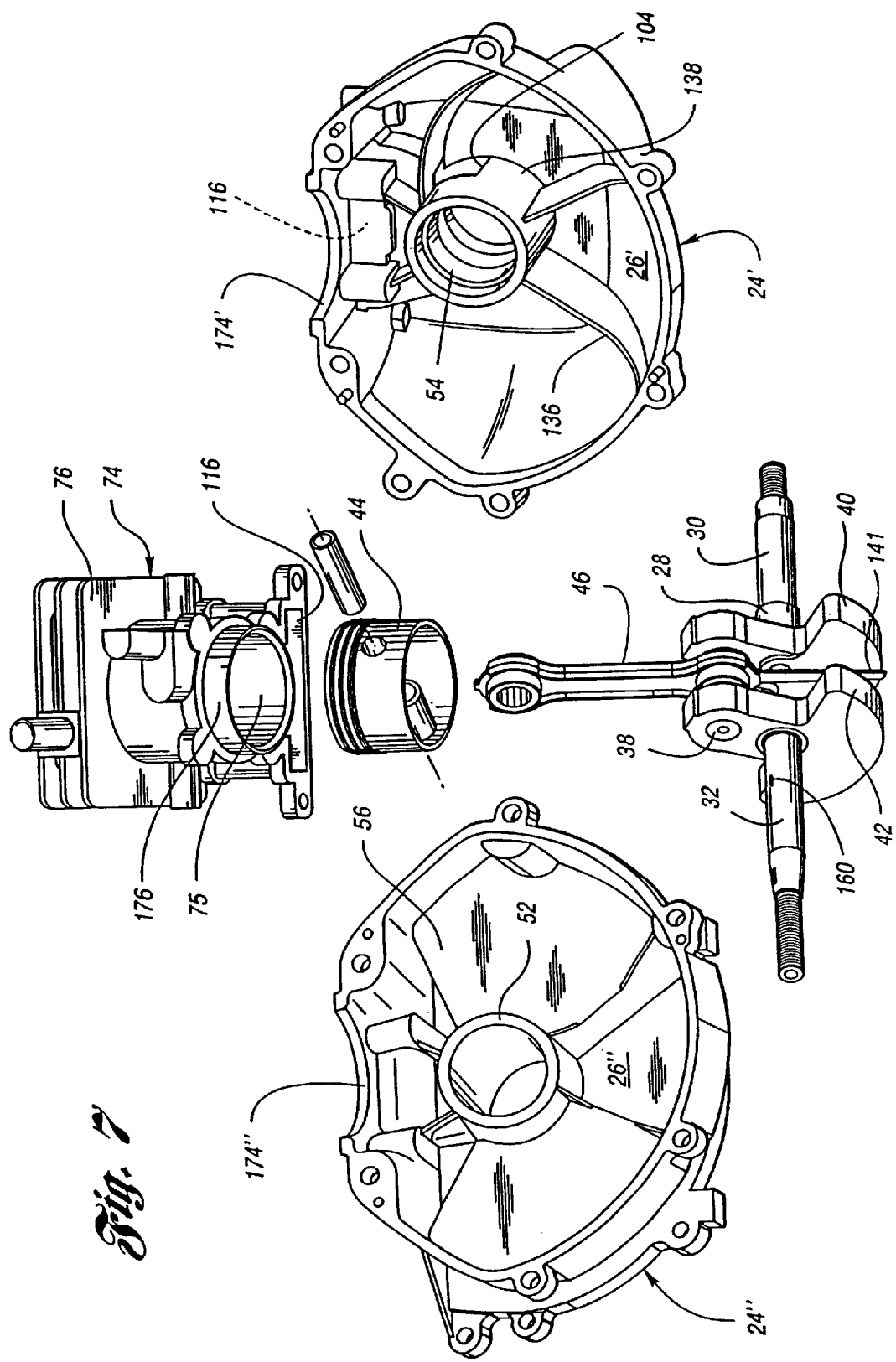
FIG. 7 is an exploded view of the engine crankcase die castings of FIGS. 1, 2 and 3, the crankshaft, the piston and the cylinder block casting.

FIG. 7 is an exploded view of the crankcase, the cylinder block 74, the piston 44 and the crankshaft 28. The crankcase is a two-piece die casting, the two parts being joined together during engine assembly to form a unitary crankcase. For purposes of clarity, the two die cast pieces that comprise the crankcase are identified in FIG. 7 by separate reference numerals 24' and 24", which correspond to reference numeral 24 used in the other views.

FIG. 7 illustrates the crankcase for the engine of FIGS. 1, 2 and 3. It does not show splashguard baffles as used in the engine of FIGS. 5 and 6.

The upper surface of the crankcase housing has a circular opening defined by semicircular portions 174' and 174" formed in the die cast crankcase housing parts 24' and 24", respectively. The cylinder 75 has a lower skirt 176 that is received in the opening 174'/174".

The window 104 is clearly visible in the illustration of crankcase part 24'. It establishes communication between the cam chamber and the crankcase chamber. The crankcase chamber is illustrated for purposes of clarity in FIG. 7 by reference numerals 26' and 26" rather than by single reference numeral 26.

Cam chamber 116 is partly defined by the crankcase part 24' and the cylinder block 74, which also is an aluminum alloy die casting.

Although we have shown specific embodiments of the invention, various modifications may be made by persons skilled in the art without departing from the scope of the invention. It is intended that all such modifications, as well as equivalents thereof, will be within the scope of the following claims.

What is claimed is:

1. An operator-carried, lightweight power tool comprising a frame with an implement mounted thereon, a four-stroke internal combustion engine with a crankshaft drivably connected to said implement, said engine being supported by said frame;

said engine comprising a crankcase with a lubrication oil chamber, a cylinder block secured to said crankcase and having a cylinder bore and a cam chamber;

a cylinder head secured to said cylinder block;

overhead intake and exhaust valve ports in said cylinder head;

a valve cover defining a valve chamber, said valve chamber enclosing intake and exhaust valves which register with said intake and exhaust valve ports;

a cam and cam drive mechanism in said cam chamber, said cam drive mechanism including valve operating push rods;

a rocker arm assembly in said valve chamber drivably connecting said push rods and said intake and exhaust valves;

at least one push rod opening and at least one of said push rods extending through said push rod opening;

said crankcase lubrication oil chamber being in communication with said valve chamber through said push rod opening;

an oil mist generator drivably connected to said crankshaft, liquid oil in said lubrication oil chamber being agitated by said oil mist generator into an oil mist;

an open passageway between said lubrication oil chamber and said cam chamber whereby said lubrication oil chamber, said cam and cam gear chamber and said valve chamber define a closed oil mist containment permitting lubrication oil mist distribution throughout the engine;

a crankshaft passage formed in said crankshaft including an oil mist flow entrance portion extending in a radially outward direction from said crankshaft;

said engine having an air/fuel induction system communicating with said intake valve port; and oil mist flow passage structure extending from said crankshaft passage to said induction system whereby crankcase gases are scavenged; and baffle structure between said crankcase and said cylinder bore;

said engine including a piston in said cylinder bore and a piston rod connecting said piston to said crankshaft, said baffle structure defining an opening through which said piston rod extends whereby excess lubrication oil distribution to said cylinder bore is minimized thus reducing oil consumption.

2. An operator-carried, lightweight power tool comprising a frame with an implement mounted thereon, a four-stroke internal combustion engine with a crankshaft drivably connected to said implement, said engine being supported by said frame;

said engine comprising a crankcase with a lubrication oil chamber, a cylinder block secured to said crankcase and having a cylinder bore and a cam chamber;

a cylinder head secured to said cylinder block;

overhead intake and exhaust valve ports in said cylinder head;

a valve cover defining a valve chamber, said valve chamber enclosing intake and exhaust valves which register with said intake and exhaust valve ports;

a cam and cam drive mechanism in said cam chamber, said cam drive mechanism including valve-operating push rods;

a rocker arm assembly in said valve chamber drivably connecting said push rods and said intake and exhaust valves;

at least one push rod opening and at least on of said push rods extending through said push rod opening;

said crankcase lubrication oil chamber being in communication with said valve chamber through said push rod opening;

an oil mist generator drivably connected to said crankshaft, liquid oil in said lubrication oil chamber being agitated by said oil mist generator into an oil mist; and an open passageway between said lubrication oil chamber and said cam chamber whereby said lubrication oil chamber, said cam chamber and said valve chamber define a closed oil mist containment permitting lubrication oil mist distribution throughout the engine;

a baffle structure between said crankcase and said cylinder bore;

said engine including a piston in said cylinder bore and a piston rod connecting said piston to said crankshaft, said baffle structure defining an opening through which said piston rod extends whereby excess lubrication oil distribution to said cylinder bore is minimized thus reducing oil consumption.

3. An internal combustion engine having a four-stroke cycle comprising a cylinder block, a crankcase below said cylinder block;

a cylinder bore in said cylinder block;

a piston in said cylinder bore;

a crankshaft journalled in said crankcase;

a connecting rod connecting drivably said piston and said crankshaft;

said crankcase containing lubrication oil and said engine including lubrication oil distribution means for circulating oil throughout the engine; and baffle structure between said cylinder bore and said crankcase, said baffle structure semi-isolating oil in said crankcase from said cylinder bore whereby excess oil distribution to said bore is avoided.

4. The engine as set forth in claim 3 wherein said baffle structure defines an opening through which said connecting rod extends, said opening providing a limited flow area for lubrication oil to enter said cylinder bore from said crankcase.

* * * * *